US007448198B2

(12) United States Patent
Trumper et al.

(10) Patent No.: US 7,448,198 B2
(45) Date of Patent: Nov. 11, 2008

(54) GAS TURBINE BRAKING APPARATUS AND METHOD

(75) Inventors: Ronald Trumper, St. Bruno (CA); Stephan Arthur Anderson, Verdun (CA); Kevin Allan Dooley, Mississauga (CA); Joseph Horace Brand, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 0 days.

(21) Appl. No.: 11/677,168

(22) Filed: Feb. 21, 2007

(65) Prior Publication Data

US 2007/0298931 A1 Dec. 27, 2007

Related U.S. Application Data

(62) Division of application No. 10/927,600, filed on Aug. 27, 2004, now Pat. No. 7,225,607.

(51) Int. Cl.
*F02C 6/08* (2006.01)
*F02K 3/06* (2006.01)

(52) U.S. Cl. .......................... 60/204; 60/226.1; 60/785

(58) Field of Classification Search ................ 60/226.1, 60/223, 39.163, 786–790, 204, 785
See application file for complete search history.

(56) References Cited

U.S. PATENT DOCUMENTS

| | | | | | |
|---|---|---|---|---|---|
| 2,770,946 | A | * | 11/1956 | Savin, Jr. | 60/786 |
| 3,009,318 | A | * | 11/1961 | Skoff | 60/264 |
| 3,048,364 | A | * | 8/1962 | Clinton, Jr. et al. | 415/9 |
| 3,182,898 | A | * | 5/1965 | Hewson | 60/226.1 |
| 3,375,997 | A | * | 4/1968 | Gist, Jr. | 60/226.1 |
| 3,483,696 | A | * | 12/1969 | Gilbert et al. | 60/792 |
| 4,799,354 | A | * | 1/1989 | Midgley | 60/788 |
| 5,029,439 | A | * | 7/1991 | Berneuil et al. | 60/39.091 |

OTHER PUBLICATIONS

ATR 72-200/-210 "The Regional Way to Profitability", Jun. 2003, pp. 36-39, An Alenia Aeronautica and EADS joint venture.*

* cited by examiner

*Primary Examiner*—Ted Kim
(74) *Attorney, Agent, or Firm*—Ogilvy Renault LLP

(57) ABSTRACT

A device is provided which can serve one or more of the multiple functions of impeding rotation of a shaft de-coupled turbine rotor, selectively impeding rotation of a first spool of the engine, for example to permit a second spool to generate power for use in ground operation, and facilitating reduced aircraft ground speed.

5 Claims, 3 Drawing Sheets

GAS TURBINE BRAKING APPARATUS AND METHOD

RELATED APPLICATIONS

This application is a divisional of U.S. application Ser. No. 10/927,600 filed Aug. 27, 2004, now U.S. Pat. No. 7,225,607 issued on Jun. 5, 2007.

TECHNICAL FIELD

The invention relates generally to gas turbine engines and, more particularly, to a multi-purpose brake system.

BACKGROUND OF THE ART

Aircraft on the ground need to be supplied with compressed air and electrical power. The usual source is an APU installed in the aircraft or where available, a ground cart. An alternative used in dual spool gas turbine turboprop engines is to run one engine while a propeller brake, connected to the reduction gear box (RGB), locks rotation of the low spool (i.e. the one that drives the propeller) while the high spool is permitted to run and therefore may supply compressed air to drive the generator. Turbofan engines, however, have neither a propeller brake nor an ROB, and thus cannot benefit from this solution. An improved solution more universally applicable to gas turbine engines is therefore desired.

SUMMARY OF THE INVENTION

It is therefore an object of this invention to provide a multi-purpose low spool brake system that addresses the above-mentioned concerns.

In one aspect, the present invention provides an aircraft engine comprising at least first and second shafts concentrically arranged and independently rotatable with respect to one another, the first and second shafts respectively connecting first and second turbine stages to first and second compressor stages, the aircraft engine having a braking apparatus includes a first member disposed and adapted impede rotation of the first shaft in the event that the first shaft de-couples and moves rearwardly into contact with the braking apparatus, the braking apparatus including a second member selectively moveable into engagement with at least one surface connected to the first spool to thereby impede rotation of the first shaft.

In another aspect, the present invention provides a braking apparatus for an aircraft engine, the engine having concentric first second shafts with first and second turbine stages and first and second compressor stages respectively mounted thereto, the braking apparatus comprising: first means for selectively impeding rotation of the first shaft, and second means for impeding rotation of a turbine portion of the first shaft in the event that the first shaft breaks and the turbine portion decouples therefrom.

In another aspect, the present invention provides a brake for an aircraft engine having independently rotatable low and high pressure spools, the low pressure spool comprising a low pressure compressor driven by a low pressure turbine through a low spool drive shaft, the brake comprising: at least a first braking surface provided on the low pressure spool, at least a second braking surface disposed independent of the low spool drive shaft such that the first braking surface moves against the second braking surface to impede low pressure turbine rotation in the event of an axial de-coupling of the low pressure drive shaft, and an actuator for selectively moving said second braking surface into engagement with said first braking surface to impede rotation of the low pressure spool while the high pressure spool rotates, thereby allowing said high pressure spool to be used to provide compressed air and electrical power during on-ground operation.

In another aspect, the present invention provides a method of providing power to an aircraft on the ground, the aircraft having a prime mover engine having at least first and second turbine shafts independently rotatable with respect to one another, the method comprising the steps of restraining rotation of the first shaft, and operating the engine to rotate the second turbine shaft while the first shaft is restrained to thereby provide power to the aircraft.

In another aspect, the present invention provides a method of reducing a aircraft taxiing speed of an aircraft propelled by at least one turbofan engine having at least independently rotatable first and second spools, the first spool having the engine fan mounted thereto, the method comprising the step of: operating the engine to generate thrust, reducing engine thrust by impeding rotation of the first spool.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
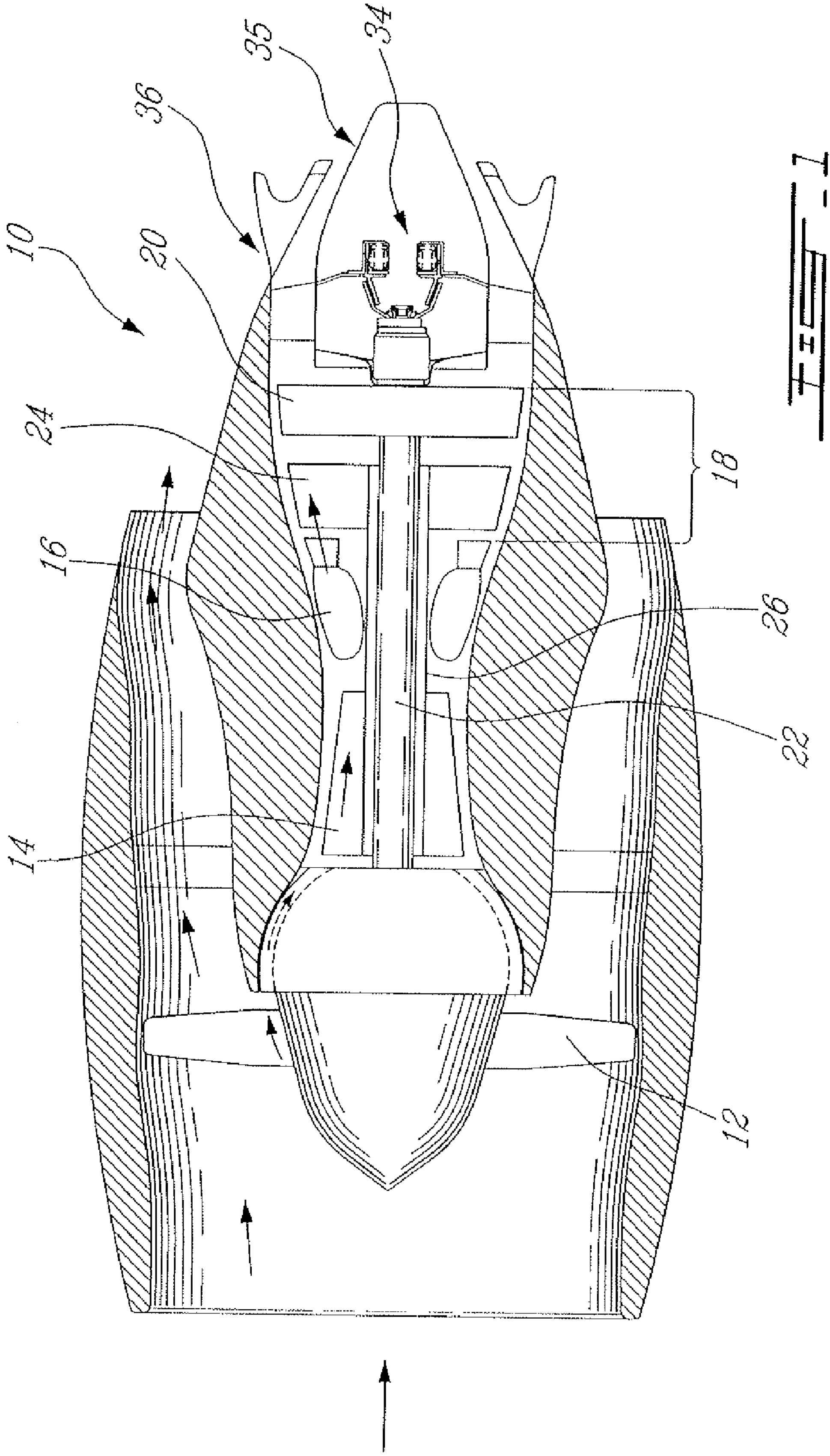
FIG. 1 is a cross-sectional side view of a gas turbine engine incorporating a multi-purpose low spool brake in accordance with an embodiment of the present invention.

FIG. 1 illustrates a twin-spool turbofan engine 10 of a type preferably provided for use in subsonic flight, generally comprising in serial flow communication a fan 12 (or low pressure compressor) through which ambient air is propelled, a high pressure compressor 14 for further pressurizing the air, a combustor 16 in which the compressed air is mixed with fuel and ignited for generating an annular stream of hot combustion gases, and a turbine section 18 for extracting energy from the combustion gases.

The turbine section 18 comprises a low pressure turbine 20 having at least one last downstream rotor stage including a turbine rotor 28 (FIG. 2) securely mounted on a turbine shaft 22 drivingly connected to the fan 12 to form the low pressure spool of the engine 10. The turbine section 18 further includes a high pressure turbine 24 drivingly connected to the high pressure compressor 14 via a tubular shaft 26 concentrically mounted about the shaft 22. The high pressure compressor 14, the high pressure turbine 24 and its shaft 26 form the high pressure spool of the engine 10. The low spool and the high spool are independently rotatable with respect to one another.

Figure 2:
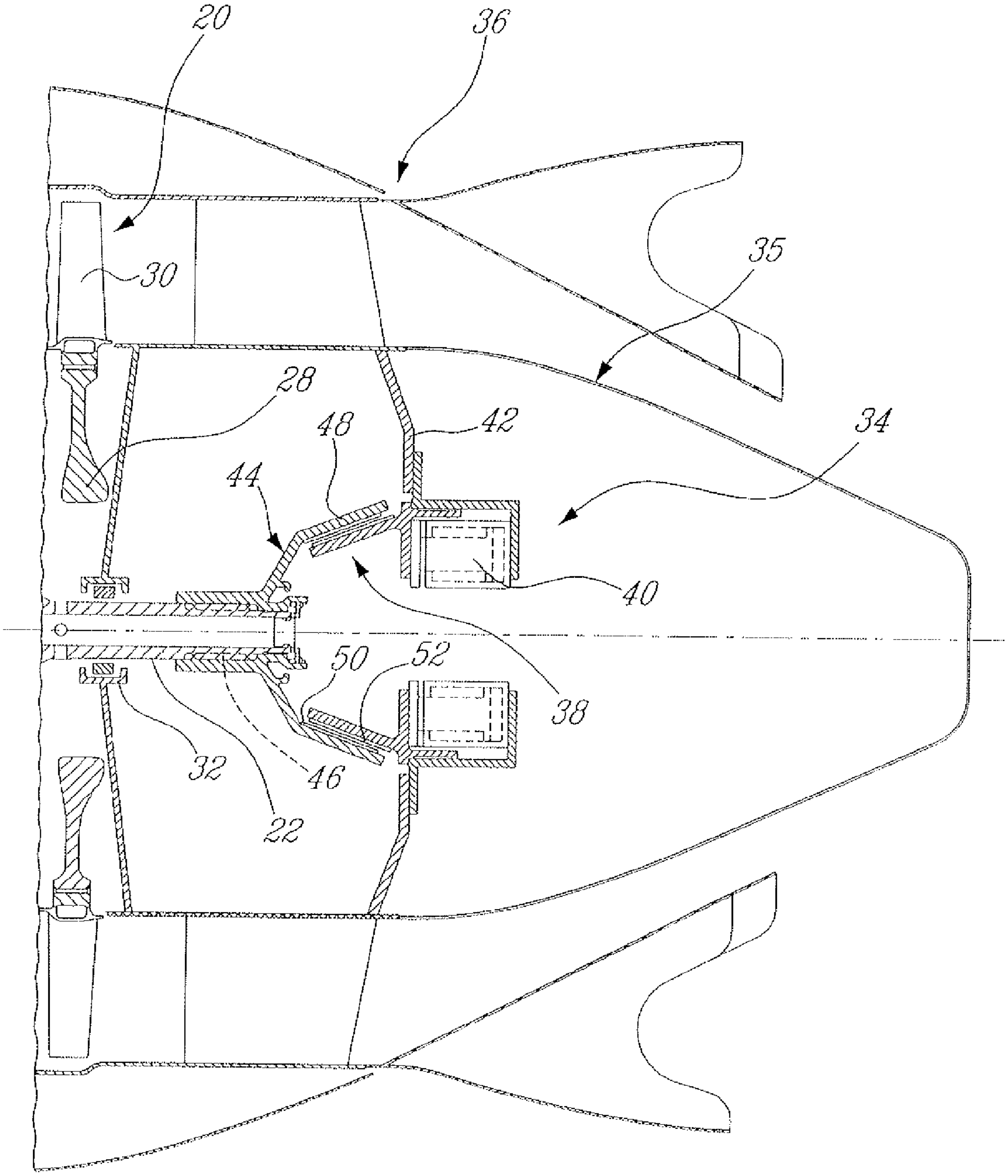
FIG. 2 is an enlarged cross-sectional side view of a rear section of the engine shown in FIG. 1, illustrating one possible construction of the multi-purpose low spool brake.

As shown in FIG. 2, the turbine rotor 28 is provided in the form of a conventional rotor disk carrying a number of circumferentially distributed turbine blades 30. The turbine rotor 28 is mounted to shaft 22 which is supported along the length thereof by bearings, such as roller bearing 32.

A multi-purpose low spool brake 34 is mounted within a hollow hub structure 35 of the engine exhaust casing 36 adjacent a rear face of the last turbine rotor 28. The multi-purpose low spool brake 34 generally comprises a braking member 38 connected to one or more actuator(s) 40 which is/are, in turn, mounted to a support structure 42 extending radially inwardly from the hollow hub structure 35 of the engine exhaust casing 36.

A shaft extension 44 is fitted over the rear end portion of the turbine shaft 22 and connected for rotation therewith via a plurality of axially extending splines 46. The shaft extension 44 has a frustoconical portion 48 extending axially rearward of the shaft 22 and is provided on an inner side thereof with a first braking surface 50.

The braking member 38 preferably has a frustoconical configuration complementary to that of the frustoconical portion 48 of the shaft extension 44 and is nested in closed proximity therewithin. The braking member 38 is provided on an outer surface thereof with a second braking surface 52 adapted to be brought in contact with the first braking surface 50 provided on the inner surface of the surrounding frustoconical portion 48 of the shaft extension 44. The first and second braking surfaces 50 and 52 are preferably annular pads of high performance braking material, such as carbon fibre or other braking materials. For instance, the first and second braking surfaces 50 and 52 could be both made of carbon-carbon material to provide carbon-carbon braking contact. Other materials having suitable properties at high temperatures could be used as well, or instead. A combination of bonding and mechanical connection is preferably used to secure the pads of braking material forming the first and second braking surfaces 50 and 52 to the shaft extension 44 and the braking member 38, respectively.

The actuator(s) 40 can be provided in various forms including pneumatic or hydraulic bellows or sliding pistons. This is not intended to be an exhaustive list. The person skilled in the art will understand, in light of the present description, that the type of actuator used to actuate the braking member 38 is not material to the present invention.

The brake of the present invention is described as "multi-purpose" because it may beneficially provide multiple functionalities, as will now be described. In a first aspect, the present invention provides an emergency shaft breakage apparatus. In the event of an accidental shaft breakage or shaft de-coupling between the fan 12 and the low pressure turbine 20 during in-flight operation of the engine 10, the low pressure turbine rotor 28 and the attached portion of the low pressure turbine shaft 22 will move axially rearward. This rearward axial movement of the turbine rotor 28 and the attached portion of shaft 22 will cause the first braking surface 50 to be axially loaded against the second braking surface 52 of the braking member 38, producing a wedge effect and a tight conical fitting between the frustoconical portion 48 of the shaft extension 44 and the braking member 38, resulting in the immobilization of the turbine rotor 28. Full braking results from the friction between the braking material on the shaft extension 44 and the braking member 38. If the engine 10 is equipped with fast response electronic engine controls having the ability to rapidly detect engine parameter changes associated with events, such as a de-coupled fan rotor, then the braking material only needs to retain its integrity for a period of time required to safely initiate electronically commanded fuel shut-off and permit the engine gases to expand through the turbine section 18.

In the above described situation, the braking member 38 acts as a stationary safety stop against which an uncoupled axially loaded turbine may move to prevent uncontrolled acceleration of the uncoupled turbine rotor prior to initiation of a fast response electronic fuel shut-off. It is noted that to perform this first function, the braking member 38 does not need to be actuated since it is the uncoupled turbine rotor which moves into engagement therewith. As will be seen hereinafter, the actuator 40 allows the low spool brake 34 to serve other functions as well.

In a second aspect, the present invention provides a generator apparatus, in conjunction with the engine, as will now be described, During on-ground operation of the engine 10, the actuator 40 may be used to selectively axially translate the first braking member 38 in an active braking position in which the braking member 38 is in braking engagement with the shaft extension 44 of the low spool shaft 22 in order to lock the low pressure spool (i.e. the fan 12, the shaft 22 and the low pressure turbine 20) against rotation while the high pressure spool is running to provide on-ground compressed air and electrical power. In this case, the low spool brake 34 acts as a brake to permit the engine to operate in a ground generator mode. By applying the braking force directly against the low pressure turbine 20, the low spool and fan are stopped, making it possible to safely operate the engine on the ground to generate power for the aircraft, for example.

In a third aspect, the brake may be used for facilitating low speed control during ground taxi operation. Very low thrust from the aircraft engines is usually required during ground taxi operations to keep ground speeds acceptably low. To achieve this with the prior art, it is necessary to reduce fuel flow to the engine to a sufficiently low level to achieve low speed, however it is difficult to achieve and maintain control of the proper fuel level to achieve a safe ground speed. Landing gear time brakes may also be used, but this causes premature landing gear brake wear, and can be uncomfortable for passengers, as applying the brakes can cause the aircraft to lurch. This ground taxi problem can be overcome with the present invention by actuating the braking member 38 to decelerate, and perhaps even stop, the low pressure spool of the engine 10 during the taxiing phase of operations such as to reduce engine thrust and noise to an extent acceptable for aircraft ground operation. This fan speed may be reduced to reduce forward thrust (and thus speed), or may be stopped altogether, and thus forward propulsion is provided by jet thrust provided by operation of the high spool alone. The low thrust level is perhaps of special benefit during operation on icy runways or taxi strips. Therefore, in use, low aircraft ground speeds can be obtained and maintained during taxi ground operation by operating the actuator 40 to translate the braking member 38 in contact with the shaft extension 44 so as to lock the engine low pressure spool against rotation while the high pressure spool is running. This constitutes a new and simpler manner of operating an aircraft engine at low speed during ground taxi operations.

Preferably, the "ground generator" brake configuration (i.e. with actuator, etc.) is provided on at least one engine of the aircraft, preferably on a side opposite the passenger entrance door, for safety and comfort reasons. Preferably, however, all engines will incorporate the "emergency" brake feature. If the "ground thrust reduction" mode is desired, the actuator is preferably provided on all engines used in taxiing, however preferably only one such engine is operated in "ground generator", as discussed above. To facilitate this flexibility, preferably a modular design is provided in which the desired configurations can be provided with the addition/substitution of a few parts to a generic subassembly.

In addition to its versatility, the above described multi-purpose low spool brake 34 has the benefit that it can be configured to require minimal changes to the engine architecture, and therefore adaptation of existing engines by retrofit is feasible.

Figure 3:
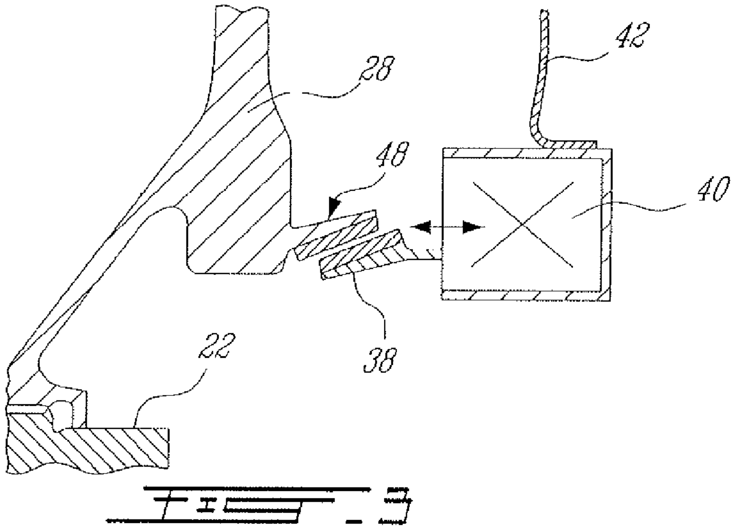
FIG. 3 is a further enlarged view similar to FIG. 2, showing a portion of another embodiment.
Figure 4:
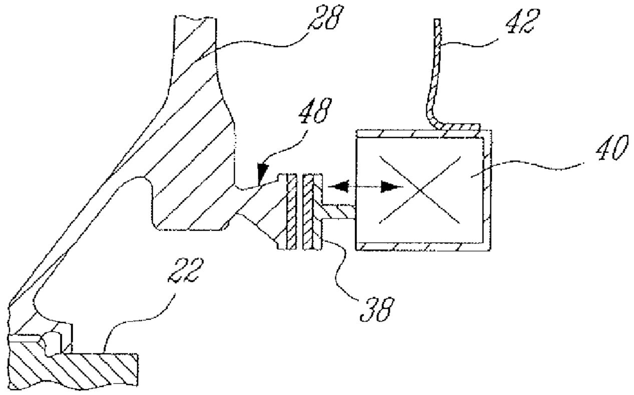
FIG. 4 is view similar to FIG. 3, showing another embodiment.
Figure 5:
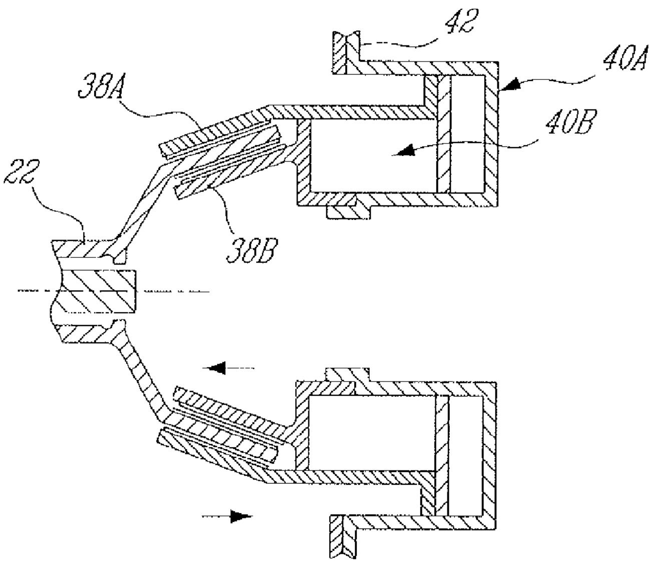
FIG. 5 is view similar to FIG. 3, showing another embodiment.

The above description is meant to be exemplary only, and one skilled in the art will recognize that changes may be made to the embodiments described without department from the scope of the invention disclosed. For example, the present invention is not limited to turbofans but could also be applied to turboshaft and turboprop engines or other twin spool engines. Also, it is understood that the braking force does not necessarily have to be applied on a shaft extension of the low pressure turbine shaft. The braking force could be, for example, directly applied on the turbine rotor disk 28 itself, as shown in FIG. 3. Furthermore, the exact location of the brake 34 is not considered critical, and may also be positioned elsewhere, though the rear of the low pressure spool is preferred. Referring to FIG. 4, although frustoconical braking surfaces are preferred, disc-like axial facing surfaces may be used, as may be any other suitable braking configuration, and the manner in which the braking surfaces are shaped is not critical to the present invention. The skilled reader will appreciate, as well, that the features of the multi-purposes brake of the present invention need not be achieved by a single structure. Referring to FIG. 5, for example, shows an embodiment in which two braking members 38 are provided, and the application of braking load is thereby provided on two sides by simultaneously retracting member 38A while extending member 38B. This can beneficially balance the axial load applied by the brake to the bearing, and thereby ensure that the shaft bearing carrying capability is not exceeded. In a further embodiment, braking member 38B may remain fixed at all times, acting only in "emergency" mode, while braking member 38A is actuated to provide "ground generator" and/or "ground thrust reduction" modes, as required. Still other modifications which fall within the scope of the present invention will be apparent to those skilled in the art, in light of a review of this disclosure, and such modifications are intended to fall within the appended claims.

The invention claimed is:

1. A method of providing power to an aircraft on the ground, the aircraft having a turbofan engine having high and low pressure turbine shafts independently rotatable with respect to one another, the low pressure turbine shaft connecting a low pressure turbine stage to an engine fan, the method comprising the steps of: mounting a braking member axially aft of the low pressure turbine stage, selectively displacing the braking member into braking engagement with the low pressure turbine stage, thereby restraining rotation of the low pressure turbine shaft, and operating the engine to rotate the high pressure turbine shaft while the low pressure turbine shaft is restrained to thereby provide at least one of compressed air and electrical power to the aircraft.

2. The method defined in claim 1, further comprising mounting a shaft extension to the low pressure turbine shaft, the shaft extension projecting axially rearward of the low pressure turbine, and displacing the braking member into engagement with the shaft extension.

3. The method defined in claim 1, comprising mounting the braking member in a position adapted to impede rotation of the low pressure turbine shaft in the event of breakage of the low pressure turbine shaft.

4. A method of reducing an aircraft taxiing speed of an aircraft propelled by at least one turbofan engine having independently rotatable first and second spools, the first spool connecting the engine fan to a low pressure turbine stage, the method comprising the steps of: mounting an actuable braking member and a brake actuator axially aft of the low pressure turbine stage, operating the engine to generate thrust, and using said brake actuator to displace the actuable braking member in braking engagement with the first spool, thereby reducing engine thrust and an aircraft taxiing speed by impeding rotation of the first spool.

5. The method as defined in claim 4, wherein impeding rotation comprises actuating the braking member to contact the first spool to one of substantially reduce and stop rotation of the first spool.

* * * * *